(12) United States Patent
Bloom et al.

(10) Patent No.: US 11,898,494 B2
(45) Date of Patent: Feb. 13, 2024

(54) PISTON RING ASSEMBLY FOR A TURBINE ENGINE

(71) Applicant: General Electric Company, Schenectady, NY (US)

(72) Inventors: Nicholas John Bloom, Maineville, OH (US); Michael Alan Stieg, Cincinnati, OH (US); Brian Christopher Towle, Leawood, KS (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/502,502

(22) Filed: Oct. 15, 2021

(65) Prior Publication Data
US 2022/0205392 A1     Jun. 30, 2022

Related U.S. Application Data

(63) Continuation of application No. 14/842,954, filed on Sep. 2, 2015, now Pat. No. 11,149,646.

(51) Int. Cl.
*F02C 7/20* (2006.01)
*F02C 7/28* (2006.01)
(Continued)

(52) U.S. Cl.
CPC .............. *F02C 7/20* (2013.01); *F02C 7/28* (2013.01); *F23R 3/007* (2013.01); *F23R 3/50* (2013.01);
(Continued)

(58) Field of Classification Search
CPC ...... F02C 7/20; F02C 7/28; F23R 3/00; F23R 3/002; F23R 3/007; F23R 3/42;
(Continued)

(56) References Cited

U.S. PATENT DOCUMENTS 2,052,160 A    8/1936   Barnes
3,604,716 A    9/1971   Webert
(Continued)

FOREIGN PATENT DOCUMENTS

CN    102597632 A    7/2012
CN    103162311 A    6/2013
(Continued)

OTHER PUBLICATIONS

Coefficients of Linear Thermal Expansion, Engineering Toolbox, 2013. Accessed Mar. 21, 2019. from Archive at: https://web.archive.org/web/20130724142822/http://www.engineeringtoolbox.com/linear-expansion-coefficients-d_95.html.

*Primary Examiner* — Jason H Duger
(74) *Attorney, Agent, or Firm* — Dority & Manning, P.A.

(57) ABSTRACT

A gas turbine engine is provided having a combustion section with a liner extending between a forward end and an aft end. A structural member is positioned in or around at least a portion of the combustion section. Additionally, a piston ring holder is provided attached to the structural member at a first end and positioned proximate to the aft end of the liner at a second end. The piston ring holder is a bimetallic member including a first portion formed of a first material and a second portion formed of a second material. A coefficient of thermal expansion of the first material is different than a coefficient of thermal expansion of the second material.

19 Claims, 3 Drawing Sheets

(51) Int. Cl.
  *F23R 3/60* (2006.01)
  *F23R 3/50* (2006.01)
  *F23R 3/00* (2006.01)

(52) U.S. Cl.
  CPC ........ *F23R 3/60* (2013.01); *F05B 2280/2004* (2013.01)

(58) Field of Classification Search
  CPC .... F23R 3/50; F23R 3/60; F23R 2900/00012; F01D 9/023; F01D 11/003; F01D 11/005; F05D 2240/55; F05B 2280/2004; F16J 9/00; F16J 9/26
  See application file for complete search history.

(56) References Cited

U.S. PATENT DOCUMENTS

| | | | |
|---|---|---|---|
| 4,497,102 A * | 2/1985 | Ikutake | B23P 15/08 277/924 |
| 5,330,321 A | 7/1994 | Roberts et al. | |
| 5,422,188 A * | 6/1995 | Lagain | C04B 41/52 428/549 |
| 5,680,767 A | 10/1997 | Lee et al. | |
| 5,996,335 A | 12/1999 | Ebel | |
| 6,234,755 B1 | 5/2001 | Bunker et al. | |
| 6,383,602 B1 | 5/2002 | Fric et al. | |
| 6,397,603 B1 | 6/2002 | Edmondson et al. | |
| 6,435,514 B1 | 8/2002 | Aksit et al. | |
| 6,655,148 B2 | 12/2003 | Calvez et al. | |
| 6,662,568 B2 | 12/2003 | Shimizu et al. | |
| 6,840,519 B2 | 1/2005 | Dinc et al. | |
| 6,904,757 B2 | 6/2005 | Mitchell et al. | |
| 7,234,306 B2 * | 6/2007 | Aumont | F23R 3/007 60/753 |
| 7,237,389 B2 | 7/2007 | Ryan et al. | |
| 7,328,580 B2 | 12/2008 | Lee et al. | |
| 7,572,099 B2 | 8/2009 | Addis | |
| 7,849,696 B2 | 12/2010 | De Sousa et al. | |
| 7,997,867 B1 | 8/2011 | Shih et al. | |
| 8,057,179 B1 | 11/2011 | Liang | |
| 8,057,181 B1 | 11/2011 | Liang | |
| 8,141,370 B2 | 3/2012 | Bulman et al. | |
| 8,141,371 B1 | 3/2012 | Habarou et al. | |
| 8,177,497 B2 | 5/2012 | Benoit et al. | |
| 8,556,531 B1 | 10/2013 | Bird et al. | |
| 8,572,981 B2 | 11/2013 | Bunker | |
| 8,607,577 B2 | 12/2013 | Ruberte Sanchez et al. | |
| 8,689,586 B2 | 4/2014 | Hirayama et al. | |
| 8,739,547 B2 | 6/2014 | Jarmon et al. | |
| 8,756,935 B2 | 6/2014 | Duval et al. | |
| 8,834,056 B2 | 9/2014 | Keith et al. | |
| 8,863,527 B2 | 10/2014 | Holcomb et al. | |
| 9,097,211 B2 | 8/2015 | Martinez et al. | |
| 9,127,565 B2 | 9/2015 | Keller et al. | |
| 9,423,129 B2 | 8/2016 | Graves et al. | |
| 2004/0118122 A1 | 6/2004 | Mitchell et al. | |
| 2004/0154303 A1 * | 8/2004 | Mitchell | F01D 11/005 60/752 |
| 2005/0135931 A1 | 6/2005 | Nakamata et al. | |
| 2008/0286090 A1 | 11/2008 | Okita | |
| 2011/0097191 A1 | 4/2011 | Bunker | |
| 2011/0271684 A1 | 11/2011 | Corsmeier et al. | |
| 2011/0293423 A1 | 12/2011 | Bunker et al. | |
| 2011/0305583 A1 | 12/2011 | Lee et al. | |
| 2013/0175015 A1 | 7/2013 | Tanaka et al. | |
| 2013/0205787 A1 | 8/2013 | Zelesky et al. | |
| 2013/0205791 A1 | 8/2013 | Mongillo, Jr. et al. | |
| 2013/0205792 A1 | 8/2013 | Gleiner et al. | |
| 2013/0209229 A1 | 8/2013 | Xu et al. | |
| 2013/0209236 A1 | 8/2013 | Xu | |
| 2013/0209269 A1 | 8/2013 | Gleiner et al. | |
| 2015/0016971 A1 | 1/2015 | Freeman et al. | |
| 2015/0330633 A1 | 11/2015 | Graves et al. | |
| 2016/0047459 A1 | 2/2016 | Landwehr et al. | |
| 2016/0215980 A1 | 7/2016 | Chang | |
| 2016/0215981 A1 | 7/2016 | Dery | |
| 2016/0265389 A1 | 9/2016 | Jarmon | |
| 2017/0015596 A1 * | 1/2017 | Fisk | B23K 20/16 |
| 2017/0059160 A1 | 3/2017 | Bloom et al. | |
| 2017/0059166 A1 | 3/2017 | Bloom et al. | |

FOREIGN PATENT DOCUMENTS

| | | | |
|---|---|---|---|
| DE | 102013220482 B3 | 4/2015 | |
| EP | 1152191 A2 | 11/2001 | |
| EP | 1265031 A1 | 12/2002 | |
| EP | 1445537 A2 | 8/2004 | |
| EP | 1719949 A2 | 11/2006 | |
| EP | 1777461 A2 | 4/2007 | |
| EP | 2366678 A2 | 9/2011 | |
| FR | 3004518 A1 | 10/2014 | |
| FR | 3022480 A1 | 12/2015 | |
| JP | 2004176911 A | 6/2004 | |
| JP | 2014227885 A | 12/2014 | |
| WO | WO2013/188645 A2 | 12/2013 | |
| WO | WO2014/137444 A2 | 9/2014 | |
| WO | WO2014/189589 A2 | 11/2014 | |
| WO | WO2015/038274 A1 | 3/2015 | |

* cited by examiner

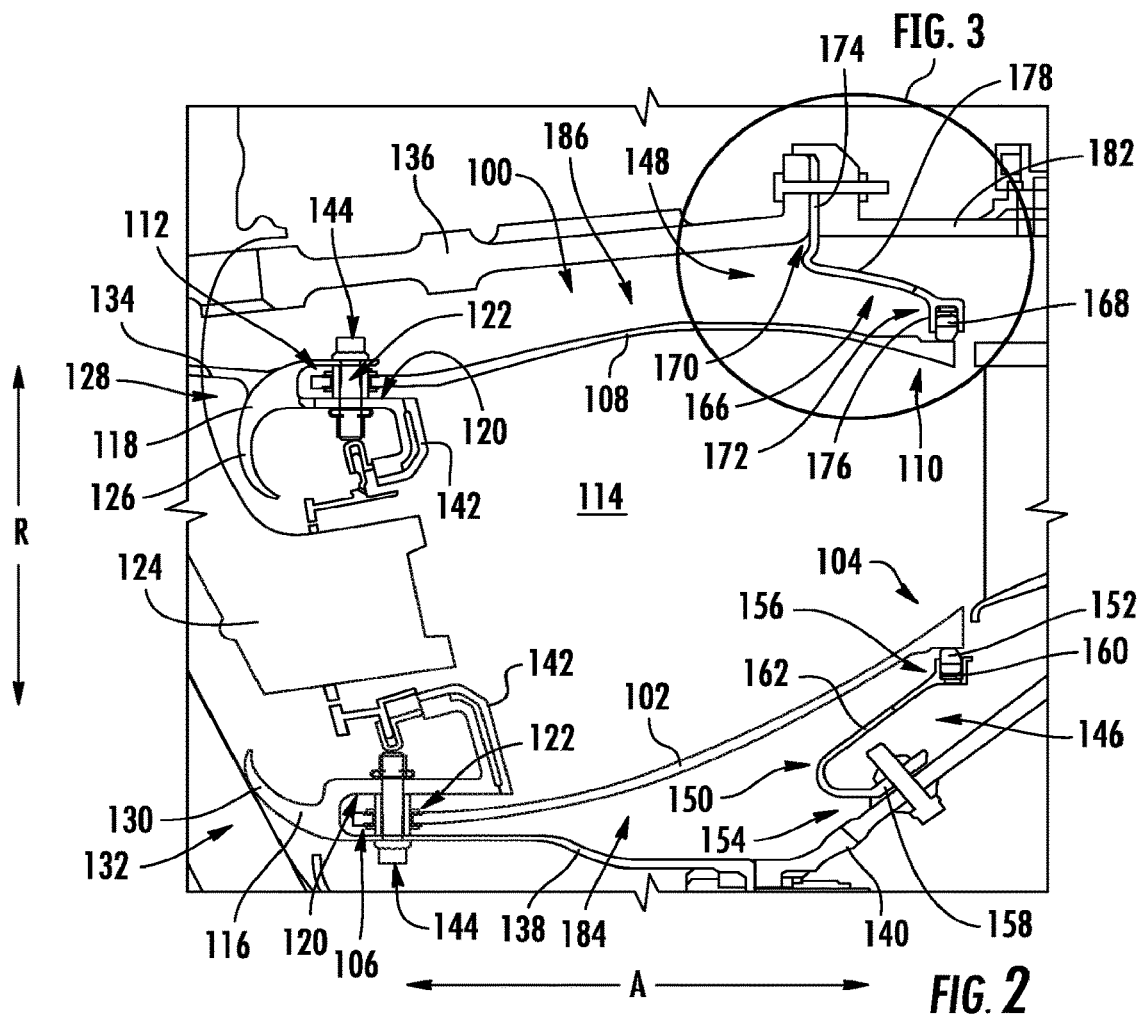
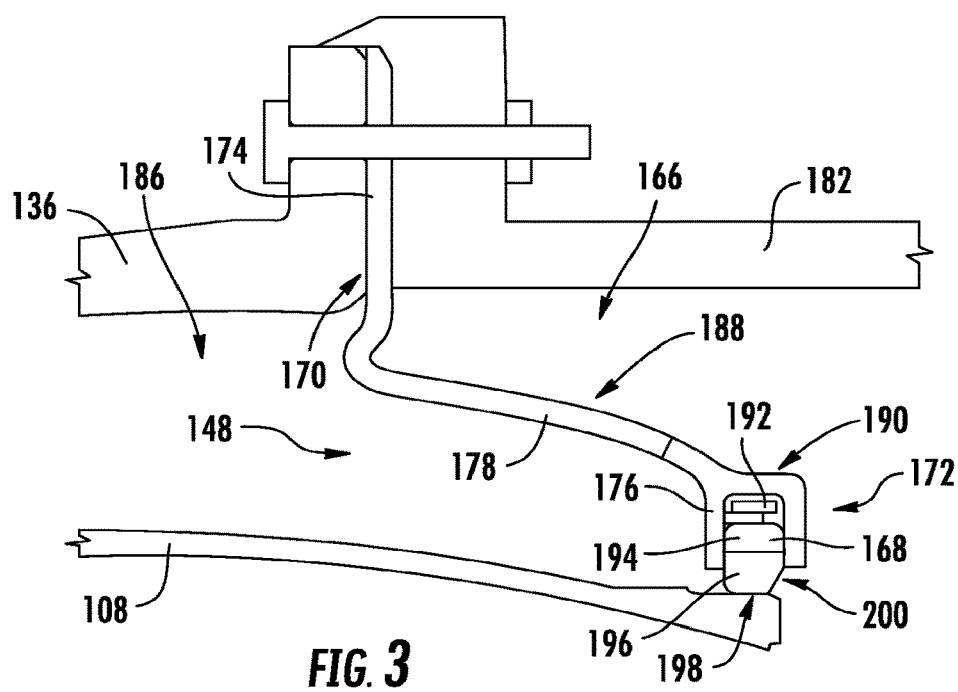
FIG. 3

PISTON RING ASSEMBLY FOR A TURBINE ENGINE

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given an ability for CMC materials to withstand relatively extreme temperatures, there is particular interest in replacing components within the combustion section of the gas turbine engine with CMC materials. More particularly, an inner liner and an outer liner of gas turbine engines are more commonly being formed of CMC materials.

However, certain gas turbine engines have had problems accommodating certain mechanical properties of the CMC materials incorporated therein. For example, CMC materials have different coefficients of thermal expansion than the traditional metal materials. Accordingly, forming a seal between an aft end of the outer liner and an outer casing, as well as between an aft end of the inner liner an inner support member, can be difficult.

Certain gas turbine engines include piston rings around the aft ends of the inner liner and the outer liner, the piston rings held in place by one or more piston ring holders attached to the outer casing or inner support member. The piston rings can form a seal with the aft ends of the inner and outer liners. However, due at least in part to the differing coefficients of thermal expansion between the metal components to which the piston ring holders are mounted and the CMC liners, it can be difficult to maintain a desired seal with the forward ends of the inner and outer liners.

Accordingly, a piston ring assembly for a gas turbine engine capable of accommodating the differing coefficients of thermal expansion between the metal components to which it is attached and the CMC liners would be useful. More particularly, a piston ring assembly for a gas turbine engine capable of accommodating the differing coefficients of thermal expansion between the metal components to which it is attached and the CMC liners having an increased useful life would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining an axial direction is provided. The gas turbine engine includes a combustion section including a liner extending between a forward end and an aft end generally along the axial direction. The liner at least partially defines a combustion chamber. The gas turbine engine also includes a structural member positioned in or around at least a portion of the combustion section and a piston ring holder including a first end and a second end. The piston ring holder is attached to the structural member at the first end and is positioned proximate to the aft end of the liner at the second end. The piston ring holder further includes a first portion formed of a first material having a first coefficient of thermal expansion, $\alpha_{H1}$, and a second portion formed of a second material having a second coefficient of thermal expansion, $\alpha_{H2}$. The first coefficient of thermal expansion, $\alpha_{H1}$, is different than the second coefficient of thermal expansion, $\alpha_{H2}$.

In another exemplary embodiment of the present disclosure, a piston ring assembly is provided for a gas turbine engine including a structural member positioned in or around at least a portion of a combustion section. The combustion section has a liner extending between a forward end and an aft end. The piston ring assembly includes a piston ring configured to extend around the aft end of the liner, and a piston ring holder including a flange for attachment to the structural member of the gas turbine engine at a first end and a slot for receiving the piston ring at a second end. The piston ring holder further includes a first portion formed of a first material having a first coefficient of thermal expansion, $\alpha_{H1}$, and a second portion formed of a second material having a second coefficient of thermal expansion, $\alpha_{H2}$. The first coefficient of thermal expansion, $\alpha_{H1}$, is different than the second coefficient of thermal expansion, $\alpha_{H2}$.

In yet another exemplary embodiment of the present disclosure, a piston ring assembly is provided for a gas turbine engine including a structural member positioned in or around at least a portion of a combustion section. The combustion section has a liner extending between a forward end and an aft end. The piston ring assembly includes a piston ring holder including a flange for attachment to the structural member of the gas turbine engine at a first end and a slot at a second end. The piston ring assembly also includes a piston ring configured to extend around the aft end of the liner. The piston ring is received in the slot of the piston ring holder and includes a first material having a first coefficient of thermal expansion, $\alpha_{PR1}$, and a second material having a second coefficient of thermal expansion, $\alpha_{PR2}$. The first coefficient of thermal expansion, $\alpha_{PR1}$, is different than the second coefficient of thermal expansion, $\alpha_{PR2}$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 is a schematic, cross-sectional view of a combustor assembly in accordance with an exemplary embodiment of the present disclosure.

FIG. 3 is a close up, cross-sectional view of an aft end of an outer liner of the exemplary combustor assembly of FIG. 2 along with a piston ring assembly in accordance with an exemplary embodiment of the present disclosure.

DETAILED DESCRIPTION OF THE INVENTION

Figure 1:
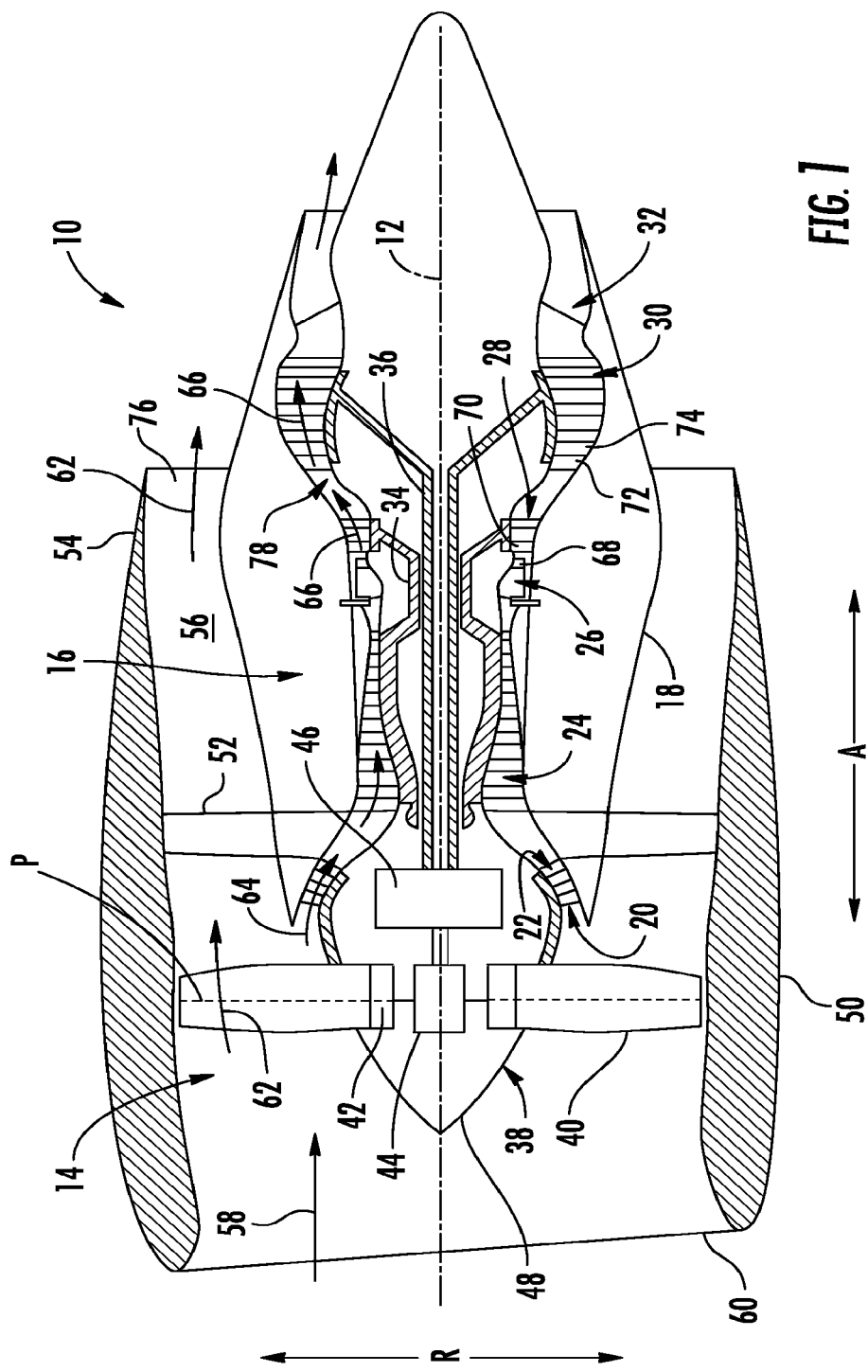
FIG. 1 is a schematic cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration.

Referring now to FIG. 2, a close-up, cross-sectional view is provided of a combustor assembly 100 in accordance with an exemplary embodiment of the present disclosure. For example, the combustor assembly 100 of FIG. 2 may be positioned in the combustion section 26 of the exemplary turbofan engine 10 of FIG. 1.

As shown, the combustor assembly 100 generally includes an inner liner 102 extending between and aft end 104 and a forward end 106 generally along the axial direction A, as well as an outer liner 108 also extending between and aft end 110 and a forward end 112 generally along the axial direction A. The inner and outer liners 102, 108 together at least partially define a combustion chamber 114 therebetween. The inner and outer liners 102, 108 are each attached to an annular dome. More particularly, the combustor assembly 100 includes an inner annular dome 116 attached to the forward end 106 of the inner liner 102 and an outer annular dome 118 attached to the forward end 112 of the outer liner 108. The inner and outer annular domes 116, 118 each define an annular slot 122 for receipt of the forward end 106 of the inner liner 102, and the forward end 112 of the outer liner 108, respectively.

The combustor assembly 100 further includes a plurality of fuel air mixers 124 spaced along a circumferential direction within the outer dome 118. More particularly, the plurality of fuel air mixers 124 are disposed between the outer dome 118 and the inner dome 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer domes 116, 118 are configured to assist in providing such a flow of compressed air from the compressor section into or through the fuel air mixers 124. For example, the outer dome 118 includes an outer cowl 126 at a forward end 128 and the inner dome 116 similarly includes an inner cowl 130 at a forward end 132. The outer cowl 126 and inner cowl 130 may assist in directing the flow of compressed air from the compressor section 26 into or through one or more of the fuel air mixers 124.

Moreover, the inner and outer domes 116, 118 each include attachment portions configured to assist in mounting the combustor assembly 100 within the turbofan engine 10. For example, the outer dome 118 includes an attachment extension 134 configured to be mounted to an outer combustor casing 136 and the inner dome 116 includes a similar attachment extension 138 configured to attach to an annular support member 140 within the turbofan engine 10. In certain exemplary embodiments, the inner dome 116 may be formed integrally as a single annular component, and similarly, the outer dome 118 may also be formed integrally as a single annular component. It should be appreciated, however, that in other exemplary embodiments, the inner dome 116 and/or the outer dome 118 may alternatively be formed by one or more components being joined in any suitable manner. For example, with reference to the outer dome 118, in certain exemplary embodiments, the outer cowl 126 may be formed separately from the outer dome 118 and attached to the forward end 128 of the outer dome 118 using, e.g., a welding process. Similarly, the attachment extension 134 may also be formed separately from the outer dome 118 and attached to the forward end 128 of the outer dome 118 using, e.g., a welding process. Additionally, or alternatively, the inner dome 116 may have a similar configuration.

Referring still to FIG. 2, the exemplary combustor assembly 100 further includes a heat shield 142 positioned around the fuel air mixer 124 depicted. The exemplary heat shield 142, for the embodiment depicted, is attached to and extends between the outer dome 118 and the inner dome 116. The heat shield 142 is configured to protect certain components of the turbofan engine 10 from the relatively extreme temperatures of the combustion chamber 114.

For the embodiment depicted, the inner liner 102 and the outer liner 108 are each formed of a ceramic matrix composite (CMC) material, which is a non-metallic material having high temperature capability and low ductility. Exemplary CMC materials utilized for such liners 102, 108 may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials may have coefficients of thermal expansion in the range of about $1.3 \times 10^{-6}$ in/in/° F. to about $3.5 \times 10^{-6}$ in/in/° F. in a temperature of approximately 1000-1200° F.

By contrast, the inner dome 116, outer dome 118, and various other structural or non-structural components may be formed of a metal, such as a nickel-based superalloy (having a coefficient of thermal expansion of about $8.3$-$8.5 \times 10^{-6}$ in/in/° F. in a temperature of approximately 1000-1200° F.) or cobalt-based superalloy (having a coefficient of thermal expansion of about $7.8$-$8.1 \times 10^{-6}$ in/in/° F. in a temperature of approximately 1000-1200° F.). Thus, the inner and outer liners 102, 108 may be better able to handle the extreme temperature environment presented in the combustion chamber 114. However, attaching the inner and outer liners 102, 108 to the inner and outer annular domes 116, 118 may present a problem due to the differing mechanical characteristics of the components. Accordingly, a plurality of specially designed mounting assemblies 144 are utilized to attach the forward end 112 of the outer liner 108 to the outer annular dome 118, and the forward end 106 of the inner liner 102 to the inner dome 116. The mounting assemblies 144 are configured to accommodate the relative thermal expansion between the inner and outer domes 116, 118 and the inner and outer liners 102, 108 along the radial direction R.

Further, sealing the aft ends 104, 110 of the inner and outer liners 102, 108, respectively, may also present a problem. Accordingly, at the aft end 104 of the inner liner 102 and at the aft end 110 of the outer liner 108, the combustor assembly 100 includes an inner piston ring assembly 146 and an outer piston ring assembly 148, respectively. The inner piston ring assembly 146 generally includes an inner piston ring holder 150 and an inner piston ring 152, the inner piston ring holder 150 extending between a first end 154 and a second end 156. The inner piston ring holder 150 includes a flange 158 positioned at the first end 154, a slot 160 positioned at the second end 156, and an arm 162 extending from the flange 158 to the slot 160. The flange 158 is configured for attachment to a structural member positioned in or around at least a portion of the combustion section, which in the exemplary embodiment depicted is the inner annular support member 140. The slot 160 is configured for receipt of the inner piston ring 152, which extends around and contacts the aft end 104 of the inner liner 102 to form a seal with the aft end 104 of the inner liner 102.

Similarly, the outer piston ring assembly 148 generally includes an outer piston ring holder 166 and an outer piston ring 168, the outer piston ring holder 166 extending between a first end 170 and a second end 172. The outer piston ring holder 166 includes a flange 174 positioned at the first end 170, a slot 176 positioned at the second end 172, and an arm 178 extending from the flange 174 to the slot 176. The flange 174 of the outer piston ring holder 166 is similarly configured for attachment to a structural member positioned in or around at least a portion of the combustion section, which for the exemplary embodiment depicted is the combustor casing 136. More particularly, for the embodiment depicted, the flange 174 of the outer piston ring holder 166 is attached between the combustor casing 136 and a turbine casing 182. The slot 176 is configured for receipt of the outer piston ring 168, which extends around and contacts the aft end 110 of the outer liner 108 to form a seal with the aft end 110 of the outer liner 108.

Referring still to FIG. 2, the inner piston ring assembly 146 is configured to form a seal between the combustion chamber 114 and a high pressure pass through 184 defined between the inner liner 102 and the inner annular support member 140. Similarly, the outer piston ring assembly 148 is configured to form a seal between the combustion chamber 114 and a high pressure plenum 186 defined between the outer liner 108 and the combustor casing 136. Moreover, the inner and outer piston ring assemblies 146, 148 provide damping for the inner and outer liners 102, 108, respectfully, and may accommodate an expansion of the inner and outer liners 102, 108 generally along the axial direction A, as well as generally along the radial direction R. Further, as will be discussed in greater detail below with reference to FIG. 3, the inner piston ring holder 150 and the outer piston ring holder 166 are each configured as bimetallic members formed of materials configured to reduce an amount of relative thermal expansion between the inner liner 102 and the second end 156 of the inner piston ring holder 150 or the outer liner 108 and the second end 172 of the outer piston ring holder 166, respectively.

Referring now to FIG. 3, a close up, cross-sectional view is depicted of the outer piston ring assembly 148. As previously stated, the outer piston ring assembly 148 generally includes the outer piston ring holder 166 and the outer piston ring 168, with the outer piston ring holder 166 including the first end 170 and the second end 172. The flange 174 of the outer piston ring holder 166, positioned at the first end 170 of the outer piston ring holder 166, is attached to the structural member. More particularly, the flange 174 of the outer piston ring holder 166 is attached to the combustor casing 136 and turbine casing 182. The slot 176, positioned at the second end 172 of the outer piston ring holder 166, is positioned proximate to the aft end 110 of the outer liner 108 and includes the outer piston ring 168 received therein. Additionally, the arm 178 of the outer piston ring holder 166 extends from the flange 174 to the slot 176.

Furthermore, the outer piston ring holder 166 is a bimetallic member including a first portion 188 formed of a first material having a first coefficient of thermal expansion, $\alpha_{H1}$, and a second portion 190 formed of a second material having a second coefficient of thermal expansion, $\alpha_{H2}$. The first coefficient of thermal expansion, $\alpha_{H1}$, of the first material is different than the second coefficient of thermal expansion, $\alpha_{H2}$, of the second material. More particularly, for the embodiment depicted, the first coefficient of thermal expansion, $\alpha_{H1}$, of the first material is greater than the second coefficient of thermal expansion, $\alpha_{H2}$, of the second material.

By way of example, in certain exemplary embodiments, the first coefficient of thermal expansion, $\alpha_{H1}$, may be at least about ten percent greater than the second coefficient of thermal expansion, $\alpha_{H2}$, in a temperature range of 1000 degrees Fahrenheit and 1600 degrees Fahrenheit. Alternatively, however, in other embodiments, the first coefficient of thermal expansion, $\alpha_{H1}$, may be at least about twelve percent greater than the second coefficient of thermal expansion, $\alpha_{H2}$, or at least about fifteen percent greater than the second coefficient of thermal expansion, $\alpha_{H2}$, in a temperature range of 1000 degrees Fahrenheit and 1600 degrees Fahrenheit. These percent differences in coefficients of thermal expansion may fall within a range of $6\times10^{-6}$ inch per inch per degree Fahrenheit (in/in/° F.) and $1\times10^{-5}$ in/in/° F. in a temperature range of 1000 to 1600 degrees Fahrenheit.

Also by way of example, in at least certain exemplary embodiments, the first coefficient of thermal expansion, $\alpha_{H1}$, may be greater than or equal to about $8\times10^{-6}$ inch per inch per degree Fahrenheit (in/in/° F.) in a temperature range of 1000 to 1600 degrees Fahrenheit, and the second coefficient of thermal expansion, $\alpha_{H2}$, may be less than or equal to about $7.5\times10^{-6}$ in/in/° F. in a temperature range of 1000 to 1600 degrees Fahrenheit. It should be appreciated, that as used herein, terms of approximation, such as "about" or "approximately," refer to being within a ten percent margin of error.

Notably, for the embodiment depicted, the first portion 188 of the outer piston ring holder 166 (comprised of the first material) includes the flange 174 and at least a part of the arm 178 of the outer piston ring holder 166. By contrast, the second portion 190 of the outer piston ring holder 166 (comprised of the second material) includes the slot 176 and at least a part of the arm 178 of the outer piston holder 166. More particularly, for the embodiment depicted, at least about ninety percent (90%) of the arm 178 is formed of the first material and included within the first portion 188. However, in other exemplary embodiments, at least about eighty percent (80%) of the arm 178 may be formed of the first material and included within the first portion 188, or at least about seventy percent (70%) of the arm 178 may be formed of the first material and included within the first portion 188, or at least about sixty percent (60%) of the arm 178 may be formed of the first material and included within the first portion 188. It should be appreciated, however, that the above configurations are provided by way of example only and that in other exemplary embodiments, the outer piston ring holder 166 may have any other suitable configuration.

Referring still to FIG. 3, the outer piston ring 168 is positioned in the slot 176 of the outer piston ring holder 166 and is configured to contact the aft end 110 of the outer liner 108. Additionally, a spring element is positioned in the slot 176 of the piston holder 166 configured to press the outer piston ring 168 towards the aft end 110 of the liner 108. The spring element may be a single spring, or alternatively, such as in the embodiment depicted, the spring element may include a pair of springs. Specifically, the embodiment depicted includes a double cockle spring (also referred to as a wave spring) 192 compressed between the slot 176 of the outer piston ring holder 166 and the outer piston ring 168. However, in other embodiments, any other suitable spring element may be provided, any other suitable number of springs may be provided, or alternatively no spring element may be included.

Figure 4:
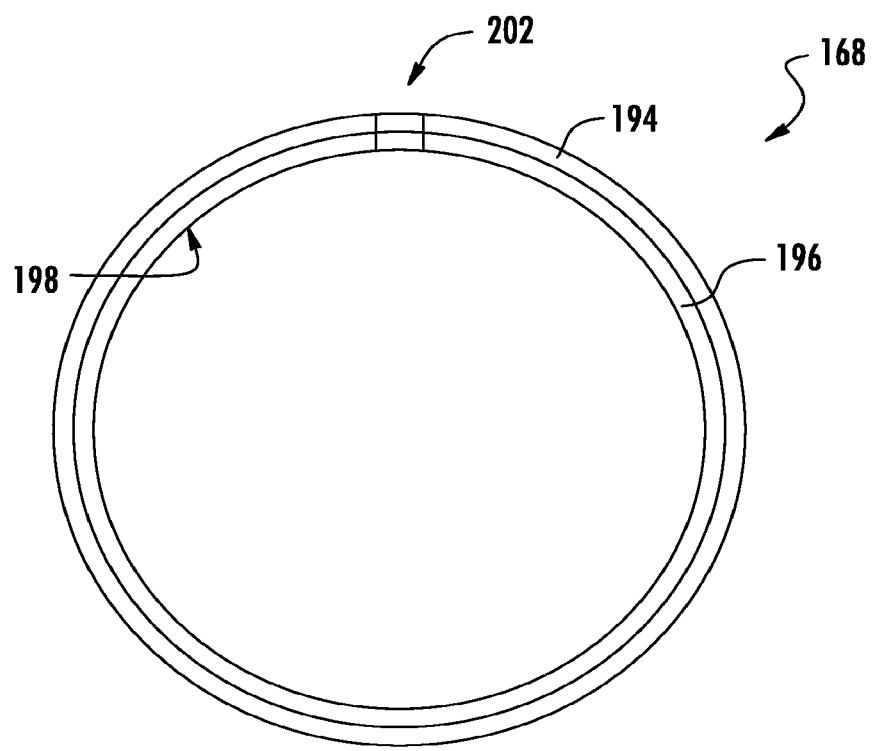
FIG. 4 is a side view of a piston ring in accordance with an exemplary embodiment of the present disclosure.

Reference will now be made also to FIG. 4, providing a side view of the exemplary outer piston ring 168 in FIG. 3. As depicted, the exemplary outer piston ring 168 is configured as a bimetallic piston ring. More particularly, the exemplary outer piston ring 168 is formed of a first material 194 having a first coefficient of thermal expansion, $\alpha_{PR1}$, and a second material 196 having a second coefficient of thermal expansion, $\alpha_{PR2}$. The first coefficient of thermal expansion, $\alpha_{PR1}$, of the first material 194 of the outer piston ring 168 is different than the second coefficient of thermal expansion, $\alpha_{PR2}$, of the second material 196 of the outer piston ring 168. More particularly, for the exemplary embodiment depicted, the first coefficient of thermal expansion, $\alpha_{PR1}$, of the first material 194 of the outer piston ring 168 is higher than the second coefficient of thermal expansion, $\alpha_{PR2}$, of the second material 196 of the outer piston ring 168. Moreover, the second material 196 of the outer piston ring 168 is generally positioned closer to the aft end 110 of the outer liner 108 and the first material 194 of the outer piston ring 168. Accordingly, the outer piston ring 168, or more particularly, the second material 196 of the outer piston ring 168, defines a contact surface 198 that contacts the aft end 110 of the outer liner 108.

By way of example, in certain exemplary embodiments, the second coefficient of thermal expansion, $\alpha_{PR2}$, of the second material 196 may be at least about ten percent less than the first coefficient of thermal expansion, $\alpha_{PR1}$, of the first material 194 in a temperature range of 1000 degrees Fahrenheit and 1600 degrees Fahrenheit. Alternatively, however, in other embodiments, the second coefficient of thermal expansion, $\alpha_{PR2}$, of the second material 196 may be at least about twelve percent less than the first coefficient of thermal expansion, $\alpha_{PR1}$, of the first material 194 or at least about fifteen percent less than the first coefficient of thermal expansion, $\alpha_{PR1}$, of the first material 194 in a temperature range of 1000 degrees Fahrenheit and 1600 degrees Fahrenheit. These percent differences in coefficients of thermal expansion may fall within a range of $6 \times 10^{-6}$ inch per inch per degree Fahrenheit (in/in/° F.) and $1 \times 10^{-5}$ in/in/° F. in a temperature range of 1000 to 1600 degrees Fahrenheit.

Also by way of example, in at least certain exemplary embodiments, the first coefficient of thermal expansion, $\alpha_{PR1}$, of the first material 194 of the outer piston ring 168 may be greater than or equal to about $8 \times 10^{-6}$ inch per inch per degree Fahrenheit (in/in/° F.) in a temperature range of 1000 to 1600 degrees Fahrenheit, and the second coefficient of thermal expansion, $\alpha_{PR2}$, of the second material 196 of the outer piston ring 168 may be less than or equal to about $7.5 \times 10^{-6}$ in/in/° F. in a temperature range of 1000 to 1600 degrees Fahrenheit.

The outer piston ring 168 further defines a chamfer 200 (FIG. 3) at an aft end of the contact surface 198. The chamber 200 may help redistribute a pressure on the seal during operations. Additionally, such a configuration may allow for a smoother interaction between the contact surface 198 and the aft end 110 of the outer liner 108 as the outer liner 108 expands or contracts relative to the metallic structural components of the gas turbine engine (e.g., the combustor casing 136 and a turbine casing 182).

Figure 5:
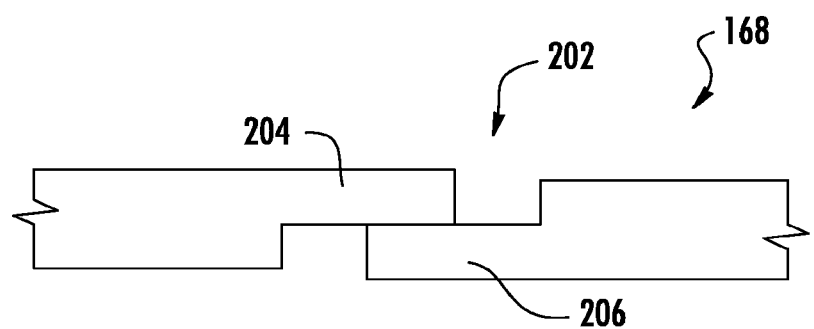
FIG. 5 is a top view of the exemplary piston ring of FIG. 4.

Referring now to FIG. 5 as well, a top view of the exemplary outer piston ring 168 is provided. As shown, the exemplary outer piston ring 168 additionally includes an expansion area 202 wherein a first end 204 and a second end 206 of the outer piston ring and 68 overlap. The expansion area 202 allows a diameter of the outer piston ring 168 to be increased or decreased, e.g., for installation of the outer piston ring 168 around the aft end 110 of the outer liner 108 and to accommodate thermal expansion of the outer liner 108.

An outer piston ring assembly 148 having such a configuration can reduce a loss of compression of the double cockle spring 192 which may otherwise occur due to the mismatch between the coefficients of thermal expansion of the outer liner 108, formed of a CMC material, and the plurality of components formed of a metal material. For example, with such a configuration, the arm 178 of the outer piston ring holder 166 of the outer piston ring assembly 148 may be configured to expand in a manner such that the second end 172 of the outer piston ring holder 166 remains proximate to the aft end 110 of the outer liner 108 during operation of the turbofan engine 10. Additionally, with such a configuration, the exemplary outer piston ring 168 of the outer piston ring assembly 148 may be configured to "self-tighten." More particularly, a greater expansion of the first material 194 of the outer piston ring 168 relative to the second material 196 of the outer piston ring 168 as the outer piston ring 168 heats up presses the contact surface against the aft end 110 of the outer liner 108.

It should be appreciated that although not depicted in greater detail, the inner piston ring assembly 146 depicted in FIG. 2 may be configured in substantially the same manner as the outer piston ring assembly 148. For example, as briefly discussed above, the inner piston ring holder 150 of the inner piston ring assembly 146 may be configured as a bimetallic piston ring holder including a first portion formed of a first material and a second portion formed of a second material. As with the outer piston ring holder 166, the first material of the inner piston ring holder 150 may have a coefficient of thermal expansion that is greater than a coefficient of thermal expansion of the second material. Additionally, the inner piston ring 152 may also be configured as a bimetallic piston ring. For example, the inner piston ring 152 may include a first material having a higher coefficient of thermal expansion than a second material of the inner piston ring 152, with the second material positioned closer to the inner liner 102. Moreover, the inner piston ring 152 may have additional similarities not described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction, the gas turbine engine comprising:
    a combustion section including a liner extending between a forward end and an aft end generally along the axial direction, the liner at least partially defining a combustion chamber;
    a structural member positioned in or around at least a portion of the combustion section;
    a piston ring configured to extend around the aft end of the liner; and
    a piston ring holder including a first end and a second end, the piston ring holder attached to the structural member at the first end and positioned proximate to the piston ring at the second end, the piston ring holder further including:

a first portion comprised of a first metal material having a first coefficient of thermal expansion, $\alpha H1$, and a second portion comprised of a second metal material having a second coefficient of thermal expansion, $\alpha H2$, the first coefficient of thermal expansion, $\alpha H1$, being different than the second coefficient of thermal expansion, $\alpha H2$, wherein the piston ring holder has a unitary non-separable configuration between the first portion and the second portion, and wherein the piston ring holder is free of ceramic materials.

2. The gas turbine engine of claim 1, wherein the first coefficient of thermal expansion, $\alpha H1$, is greater than the second coefficient of thermal expansion, $\alpha H2$.

3. The gas turbine engine of claim 1, wherein the first coefficient of thermal expansion, $\alpha H1$, is at least about ten percent greater than the second coefficient of thermal expansion, $\alpha H2$, in a temperature range of 1000 degrees Fahrenheit and 1600 degrees Fahrenheit.

4. The gas turbine engine of claim 1, wherein the piston ring holder further includes a slot at the second end, and wherein the piston ring is positioned in the slot of the piston ring holder and is configured to contact the aft end of the liner.

5. The gas turbine engine of claim 4, wherein the piston ring is a bimetallic piston ring comprised of a first material having a first coefficient of thermal expansion, $\alpha PR1$, and a second material having a second coefficient of thermal expansion, $\alpha PR2$, the first coefficient of thermal expansion, $\alpha PR1$, being different than the second coefficient of thermal expansion, $\alpha PR2$.

6. The gas turbine engine of claim 5, wherein the piston ring is an outer piston ring, wherein the second material of the piston ring is positioned closer to the liner of the combustion section than the first material of the piston ring, and wherein the second coefficient of thermal expansion, $\alpha PR2$, of the second material of the piston ring is at least about ten percent less than the first coefficient of thermal expansion, $\alpha PR1$, of the first material of the piston ring.

7. The gas turbine engine of claim 4, wherein the piston ring defines a contact surface that contacts the aft end of the liner, and wherein the piston ring further defines a chamfer at an aft end of the contact surface.

8. The gas turbine engine of claim 4, further comprising a spring element positioned in the slot of the piston ring holder configured to press the piston ring towards the aft end of the liner.

9. The gas turbine engine of claim 8, wherein the spring element includes one or more cockle springs.

10. The gas turbine engine of claim 1, wherein the piston ring holder includes a flange positioned at the first end attached to the structural member, a slot positioned at the second end, and an arm extending from the flange to the slot, wherein the first portion of the piston ring holder includes the flange and at least a part of the arm, and wherein the second portion of the piston ring holder includes the slot and at least a portion of the arm.

11. The gas turbine engine of claim 1, wherein the structural member is one of a combustor casing or an inner annular support member.

12. A piston ring assembly for a gas turbine engine including a structural member positioned in or around at least a portion of a combustion section, the combustion section having a liner extending between a forward end and an aft end, the piston ring assembly comprising:

a piston ring configured to extend around the aft end of the liner; and a piston ring holder including a first end attached to the structural member and a second end positioned proximate the piston ring at the second end, the piston ring holder further including a first portion comprised of a first metal material having a first coefficient of thermal expansion, $\alpha H1$, and a second portion comprised of a second metal material having a second coefficient of thermal expansion, $\alpha H2$, the first coefficient of thermal expansion, $\alpha H1$, being different than the second coefficient of thermal expansion, wherein the piston ring holder has a unitary non-separable configuration between the first portion and the second portion and wherein the piston ring holder is free of ceramic materials.

13. The piston ring assembly of claim 12, wherein the piston ring is a bimetallic piston ring comprised of a first material having a first coefficient of thermal expansion, $\alpha PR1$, and a second material having a second coefficient of thermal expansion, $\alpha PR2$, the first coefficient of thermal expansion, $\alpha PR1$, being different than the second coefficient of thermal expansion, $\alpha PR2$.

14. The piston ring assembly of claim 13, wherein the second material of the piston ring is configured to be positioned closer to the liner of the combustion section than the first material of the piston ring, and wherein the first coefficient of thermal expansion, $\alpha PR1$, of the first material of the piston ring is higher than the second coefficient of thermal expansion, $\alpha PR2$, of the second material of the piston ring.

15. The piston ring assembly of claim 12, wherein the piston ring holder further includes an arm extending from the first end to the second end, wherein the first portion of the piston ring holder comprises at least a portion of the arm.

16. The piston ring assembly of claim 15, wherein at least about sixty percent of the arm comprises the first metal material and comprises part of the first portion.

17. The piston ring assembly of claim 12, wherein the piston ring is an outer piston ring.

18. The piston ring assembly of claim 12, wherein the first portion comprises at least one bend.

19. The piston ring assembly of claim 18, wherein the at least one bend comprises at least one U-shaped bend.

* * * * *